Aug. 28, 1928.  
P. BRINGHENTI  
1,682,265  
PROCESS AND DEVICE FOR CONCENTRATING INCRUSTING OR CORROSIVE SOLUTIONS  
Filed Jan. 15, 1926  2 Sheets-Sheet 1

P. Bringhenti  
INVENTOR

By: Marks & Clerk  
Attys.

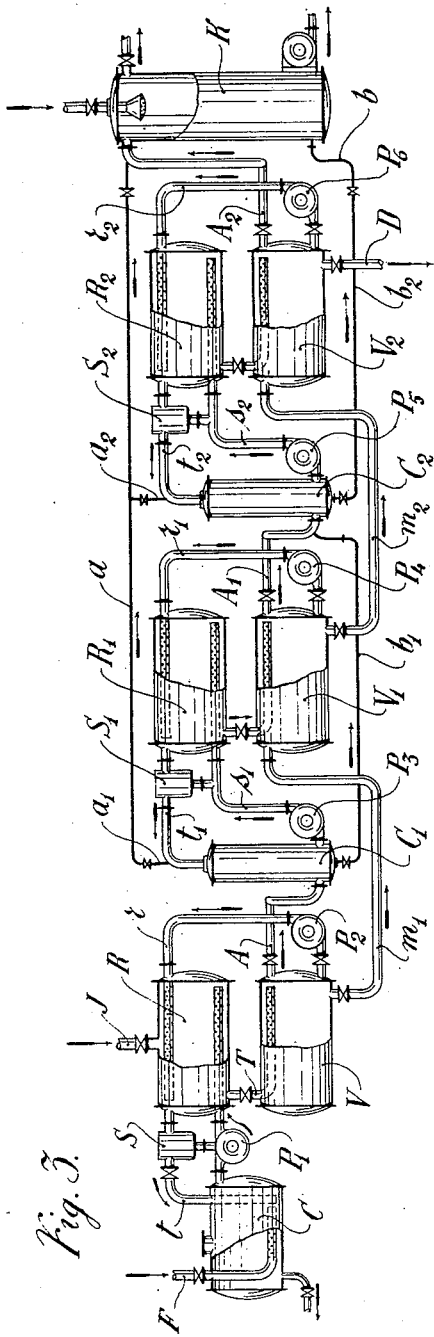

Patented Aug. 28, 1928.

1,682,265

UNITED STATES PATENT OFFICE.

PLINIO BRINGHENTI, OF MILAN, ITALY.

PROCESS AND DEVICE FOR CONCENTRATING INCRUSTING OR CORROSIVE SOLUTIONS.

Application filed January 15, 1926, Serial No. 81,599, and in Italy October 26, 1925.

This invention relates to a process of and apparatus for the concentration of solutions of the kind wherein the solution to be concentrated is subjected to direct treatment with a continuous stream of liquid heat transmitting medium, and the object of the invention is to provide an improved process of the kind referred to and apparatus therefor.

The invention consists in heating the solution to be concentrated at a temperature lower than its boiling point by continuously introducing therein a stream of finely divided heat transmitting liquid lighter than the solution and insoluble therein, floating off the said liquid, separating entrained solution therefrom, heating the separated liquid by direct contact with a hot gaseous medium so as to restore heat thereto lost to the solution, spraying the heated solution into a vessel whereby it is partly evaporated, carrying off the vapours evolved from the evaporation, returning the partly evaporated solution to the cycle for further concentration by treatment with the finely divided heated liquid repeating the cycle as often as desired and running off the concentrated solution.

The invention also consists in apparatus for carrying out the process.

The liquid which is most suitable for use as heat carrier is melted paraffin wax, a substance which is chemically inert or nearly so, only being attacked when heated by strong oxidizing agents, such as nitric acid, sulphuric acid and halogens, which moreover convert it into carbon dioxide and water, that is to say substances which do not remain in the solution. Further paraffin wax has a specific gravity of 0.78 and therefore floats easily upon all aqueous solutions.

Figures 1 to 4 in the accompanying drawing illustrate two forms of construction of the concentration device according to the invention.

Figures 3 and 4 are an elevation and a plan respectively of a device with several concentrators.

Figure 1:
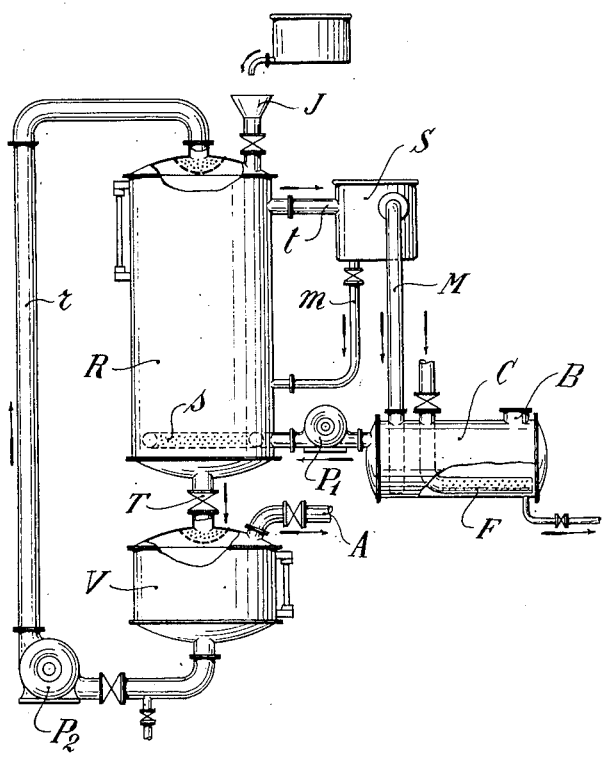
Figures 1 and 2 are two views, in vertical projection, of a single acting device.
Figure 2:
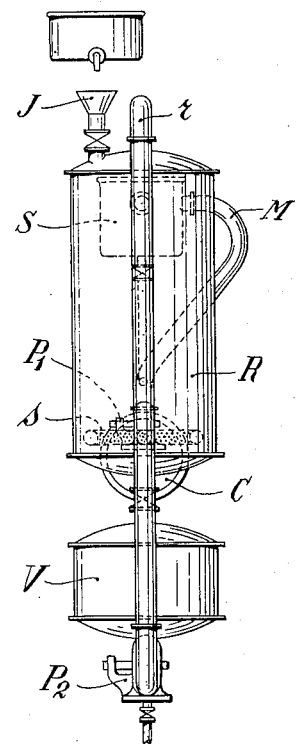

The device shown in Figures 1 and 2 operates in the following manner.

The cylindrical vessel C is filled through the opening B with liquid paraffin wax: the paraffin wax melts, according to the quality, between 40° to 70° C. In this vessel it is heated from the outside by means of either steam or hot gases admitted through the pipe F. A circulation pump $P_1$ forces the paraffin thus heated into the cylindrical vessel R, which is almost completely filled from the funnel J with the liquid to be concentrated.

The paraffin, subdivided into minute threads by the perforated coil $s$ rises here through the solution and gives up heat to it; it then enters, through the pipe $t$ into the separator S where it gives up by difference in density the solution it may have carried with it which solution returns to R through the pipe $m$; it finally reaches the vessel C through the pipe M to be again heated there.

The solution thus heated descends through the pipe T terminating at its lower part in a perforated cap and falls in a fine spray into the vessel V where it is partly vaporized. While the vapour produced escapes through the pipe A, the non-evaporated solution is taken by the pump $P_2$ and led back through the tube I into the vessel R in order to undergo in it a subsequent concentrating operation. The water which issues from A in the form of vapour is continually replaced in the vessel R by means of a funnel J by a corresponding amount of solution.

The process is continued in this way until the desired degree of concentration is obtained. The vessel R is then emptied and the operation recommenced.

The device shown in Figures 3 and 4 is similar to the previous one, but is formed of a number of concentrators. In these figures the reference numerals employed in the previous case have been applied to similar parts.

This device operates as follows:

The solution is admitted into the horizontal cylindrical vessel R by means of the funnel J while the pump $P_1$ sends liquid paraffin into the lower part of the same vessel, which paraffin has been heated in the vessel C in the manner previously described. This paraffin rises in R through the solution and regains, through the tube $t$ the vessel C where it is again heated, after having passed through the separator S in which it gives up any solution it may have carried along with it, which solution returns to R.

The heated solution then descends through the tube T and falls in a spray into the vessel V where it partly vaporizes. The non-evaporated portion is led back by the pump $P_2$ through $r$ to the vessel R; the vapour produced passes through A and enters the lower part of the vessel $C_1$.

In this vessel $C_1$ the vapour is condensed and gives up its heat to the paraffin which falls into it in the form of a rain, coming through the tube $t_1$ from the vessel $R_1$. The water of condensation formed passes out at the bottom and the duct $b_1$ leads it to the vessel $C_2$; the paraffin thus heated by the vapour is forced by the pump $P_3$ through the tube $s_1$ to heat the solution contained in the vessel $R_1$. The solution heated in $R_1$ descends into $V_1$, and partly evaporates in it. The vapour liberated passes through A, into $C_2$ and heats the paraffin which falls into it in a rain, coming from $R_2$. The residual solution is forced by the pump $P_4$ through $r_1$ into the vessel $R_1$. The vapour produced in the last vaporizer $V_2$ passes directly into the mixture condenser K where it is condensed.

The pumps $P_2$, $P_4$, $P_6$ provide for the circulation of the solution in each of the three concentrating groups, if there are three, while the pumps $P_1$, $P_3$, $P_5$ provide in them for the circulation of the liquid paraffin. The ducts $m_1$ and $m_2$ serve for the passage of the solution from the first to the second and from the latter to the third concentrator. The concentrated solution is drawn off through the pipe D. The valves $a_1$ and $a_2$ at the head of the vessels $C_1$ and $C_2$ respectively lead to the condenser K the gases which enter into or are produced in the pieces of apparatus.

The position of the reheating vessels R, $R_1$, $R_2$ and the corresponding vaporizers V, $V_1$, $V_2$ may be changed by placing each reheater R beneath its vaporizer V. In this way as the pressure existing in R is greater than in V the solution will rise from R to V, reducing to a minimum the work done by the pumps $P_2$, $P_4$, $P_6$.

The cylindrical shape of all the vessels, without internal tubes enables them to be constructed of the most suitable material for each solution. The production and efficiency of the apparatus are at all times constant as the amount of heat transmitted to the solution does not vary.

By means of this process any neutral or slightly alkaline or acid solution may be treated, even those most liable to incrust without there being any fear of objectionable conditions developing.

Having now described my invention, what I claim as new and desire to secure by Letters Patent is:—

1. In the process of concentrating solutions wherein the solution is directly treated with a liquid heat transmitting medium, heating the solution to be concentrated at a temperature lower than its boiling point by continuously introducing therein a stream of finely divided heat transmitting liquid lighter than the solution and insoluble therein; floating off the said liquid, separating entrained solution therefrom, heating the separated liquid by direct contact with a hot gaseous medium so as to restore heat thereto lost to the solution; spraying the heated solution into a vessel whereby it is partly evaporated, carrying off the vapours evolved from the evaporation, returning the partly concentrated solution to the cycle for further concentration by treatment with the finely divided heated liquid repeating the cycle as often as desired and running off the concentrated solution.

2. Apparatus for concentrating solutions comprising a vessel to contain the solution, a second vessel to contain the heat transmitting liquid, means for heating the said liquid, a pump adapted to transfer the said heated liquid to the first mentioned vessel, spraying means within said first vessel, an evaporatitng vessel in communication with said first vessel, spraying means within said evaporating vessel, a pump adapted to return partly concentrated solution from the evaporating vessel to the first vessel, an outlet for the heat transmitting liquid from said first vessel, a separator connected to said outlet adapted to separate entrained solution from the heat transmitting liquid, and return same to said first vessel, and adapted to return the heat transmitting liquid to the second vessel.

In testimony whereoef I have signed my name to this specification.

PLINIO BRINGHENTI.